(12) United States Patent  (10) Patent No.: US 6,507,699 B2
Lemoine  (45) Date of Patent: Jan. 14, 2003

(54) PHOTOGRAPHIC PROCESS AND ONE-TIME USE CAMERA TO PREVENT UNAUTHORIZED RECYCLING AND/OR REUSE OF THE CAMERA

(75) Inventor: Michel Lemoine, Chalon sur Saone (FR)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/851,891

(22) Filed: May 9, 2001

(65) Prior Publication Data

US 2001/0041068 A1 Nov. 15, 2001

(30) Foreign Application Priority Data

May 15, 2000 (FR) .............................. 00 06132

(51) Int. Cl.$^7$ .................. G03B 17/02; G03B 17/18; G03B 1/00
(52) U.S. Cl. ..................... 396/6; 396/287; 396/387
(58) Field of Search ................... 396/6, 287, 387

(56) References Cited

U.S. PATENT DOCUMENTS

| 5,418,585 A | 5/1995 | Petruchik et al. | 396/6 |
| 5,517,265 A | 5/1996 | Zander et al. | 396/6 |
| 5,666,561 A | 9/1997 | Stephenson, III | 396/6 |
| 5,937,210 A | 8/1999 | Weiser | 396/6 |

FOREIGN PATENT DOCUMENTS

| EP | 0 560 101 A | 9/1993 |
| EP | 0 721 144 A | 7/1996 |

*Primary Examiner*—D. Rutledge
(74) *Attorney, Agent, or Firm*—David A. Novais

(57) ABSTRACT

A one-time use camera including film. The camera comprises a shutter release and a device adapted to deactivate a camera function in order to prevent unauthorized reuse of the camera. The deactivating device comprises: a first counter whose value can be changed when it is detected successively that, on the one hand, the film is moved inside the camera and that, on the other hand, the shutter release is activated, and, a detector for detecting the film movement. The camera function is deactivated when the first counter reaches a limit value S.

10 Claims, 3 Drawing Sheets

PHOTOGRAPHIC PROCESS AND ONE-TIME USE CAMERA TO PREVENT UNAUTHORIZED RECYCLING AND/OR REUSE OF THE CAMERA

FIELD OF THE INVENTION

The present invention relates to a one-time use camera for preventing the unauthorized recycling and/or reuse of the camera after the film present in the camera has been completely exposed.

BACKGROUND OF THE INVENTION

One-time use cameras also called disposable cameras are, as their name implies, only intended to be used once. When the film present in the camera is completely exposed or even when the user chooses to, the camera is given to a development laboratory for the film to be developed. The user then receives their developed film with the photos. For its part the camera is returned to the manufacturer of the one-time use cameras to be recycled and reloaded with a new unexposed film.

However, it can happen that the cameras empty of their film are not returned to the initial manufacturer but that a third party recovers them to reload them with a different film which is often of lesser quality than that of the initial film. This can then devalue the make of the camera concerned.

Certain one-time use cameras already provide means for deactivating one camera function beyond a certain limit.

For example, U.S. Pat. Nos. 5,418,585; 5,517,265 and 5,534,962 describe one-time use cameras provided with a means for deactivating one camera function, which include a counter initialized to a value corresponding to the number of camera shots. The counter is decremented whenever the flash is activated. When the counter reaches zero, one camera function, in particular the flash circuit, is deactivated.

U.S. Pat. No. 5,666,561 describes a one-time use camera in which a critical component of the camera is deactivated when the total number of shots is reached. For this purpose, the camera shot counter is used, which is a disk on the periphery of which are inscribed the numbers from 0 to the total number of potential shots. The disk is driven in rotation mechanically by the user, with the movement of the film in the camera. A cam, also in disk form provided with a protuberance at one part of its periphery, is attached to the disk and is driven in rotation by the disk. When the counter reaches the value 0, that is when all the camera shots have been taken, the protuberance is arranged to close a switch causing the destruction of the camera's critical component.

SUMMARY OF THE INVENTION

It is the object of the invention to provide a new one-time use camera and a new process that prevents the unauthorized reuse of the camera by a film of different quality, by deactivating one camera function.

The invention relates to a one-time use camera including a film, the camera comprising a shutter release and a device which is adapted to deactivate a camera function in order to prevent unauthorized reuse of the camera. The deactivating device comprises:

- a first counter whose value can be changed when it is detected successively that, on the one hand, the film is moved inside the camera and that, on the other hand, the shutter release is activated; and
- a detector for detecting the film movement. The camera function is deactivated when the first counter reaches a limit value S.

The invention also relates to a process for preventing unauthorized reuse of a one-time use camera including a film, with the camera comprising a shutter release and a device for deactivating a camera function in order to prevent unauthorized reuse of the camera. The process comprises the steps of:

a) a) emitting a first signal when the film is moved in the camera;

b) emitting a second signal when the shutter release is activated;

c) varying the value of a first counter whenever both signals emitted in a) and b) are emitted successively; and d) deactivating a camera function when the first counter reaches a limit value S.

BRIEF DESCRIPTION OF THE DRAWINGS

Other characteristics will appear on reading the following description, with reference to the drawings wherein.

DETAILED DESCRIPTION OF THE INVENTION

Figure 1:
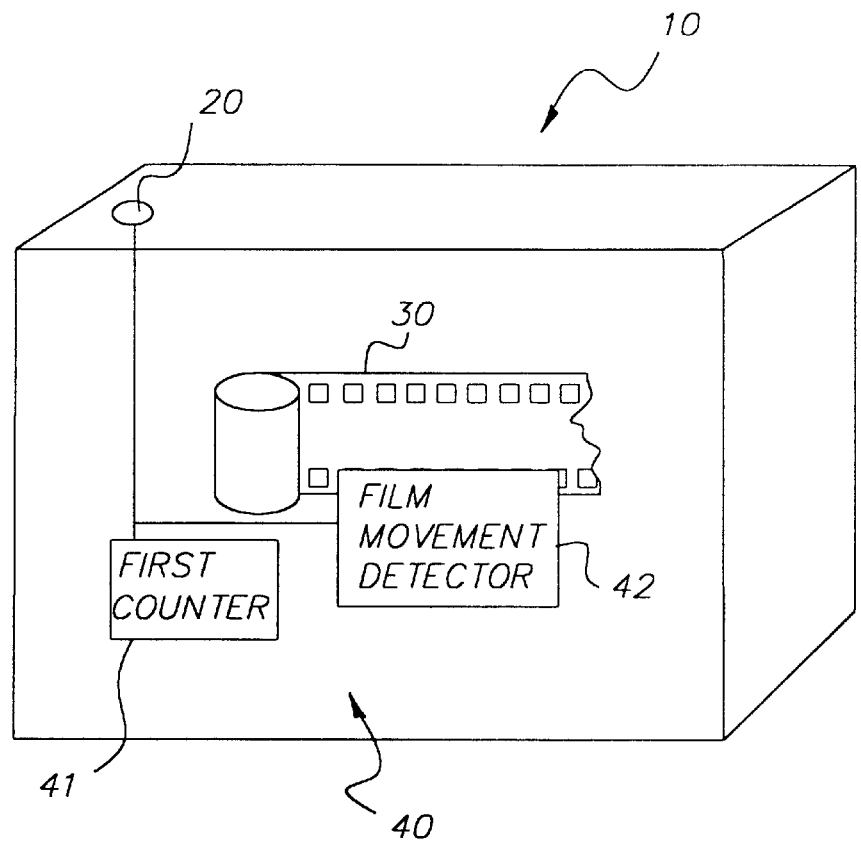
FIG. 1 is a schematic diagram of a one-time use camera.

Referring to FIG. 1, a camera with a flash can be seen schematically, however, it is clear that the invention refers to any one-time use camera, whether cameras with or without flash, or 35 mm or APS type cameras. The camera shown in FIG. 1 is a camera whose characteristics are known, which is why the following description only concerns those elements directly related to the invention.

The one-time use camera 10 conventionally comprises a shutter release 20 which triggers exposure of the film 30. According to the invention, the camera 10 comprises in addition a device 40 adapted to deactivate one camera function in order to prevent unauthorized reuse of the camera. The deactivation device 40 comprises a first counter 41 operationally associated with a film movement detector 42 and shutter release 20. First counter 41 has a value which can be changed when it is detected successively that, on the one hand, the film 30 is moved in the camera and that, on the other hand, the shutter release 20 is activated. The detector 42 detects the film movement inside the camera. When the first counter 41 reaches a limit value S, a camera function is deactivated. For example, it can be arranged that the first counter 41 is initialized to 24 when the film present in the camera provides 24 shots, and that it is decremented whenever film movement is recorded. Thus, the decrementing of the first counter 41 is certain to be when a photo has actually been taken.

Figure 2:
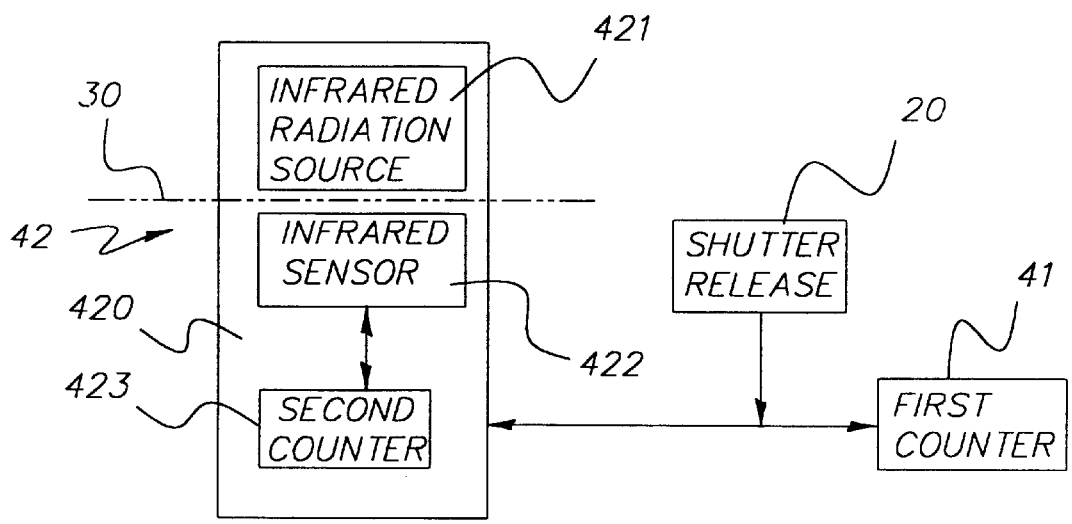
FIG. 2 is a schematic diagram of a device for deactivating a camera function.

Referring now to FIG. 2, the device for deactivating a camera function can be seen. This device is provided to prevent unauthorized reuse of the camera comprises first counter 41. The value of the first counter can be changed, that is incremented or decremented, when two signals are recorded. The first signal, which has to be recorded is a signal that is emitted when the film is moved in the camera, that is when the film is unrolled from the reel on which it is wound. The second signal which has to be recorded is a signal that is emitted when the camera shutter release is activated, that is when sufficient pressure is exerted on it to take a photo. According to the invention, the value of the first counter 41 varies when both these signals are emitted successively. The first counter 41 has a limit value S above or short of which one camera function is deactivated.

According to a preferred embodiment, the value of the first counter 41 can be changed when it is detected successively that the film 30 is moved by a length corresponding approximately to one film shot area and that the shutter release 20 is activated.

The detector 42 for detecting the film movement comprises a sensor 420 which generates a pulse when a film perforation passes. In addition the camera comprises a second counter 423 that counts the number of pulses generated by the sensor 420. The movement of the film 30 necessary to vary the value of the first counter 41 is recorded when the second counter 423 reaches a value equal to the number of film perforations corresponding to one film shot area, for example two for an APS format film, and six or seven for a 24×36 mm format film. According to the embodiment shown in FIG. 2, the sensor 420 comprises an infrared radiation source 421 associated with an infrared sensor 422. The source 421 and the sensor 422 are arranged on either side of the film edge 30.

Other sensor types can be used to record the film movement. Indeed, optoelectronic sensors can be used in other wavelengths.

When the first counter 41 reaches the limit value S, a camera function is deactivated so that the camera can no longer be used. According to a preferred embodiment, the flash is controlled by an electronic circuit that is deactivated when the first counter 41 reaches the limit value S. It is clear that other camera functions can be deactivated, as for example the shutter release. Thus, when an unauthorized person tries to refill the camera with another film, the deactivated function cannot be reactivated. Preferably, the deactivated function, for example the flash circuit can only be reactivated by an authorized person using an external signal that is difficult to decrypt.

Figure 3:
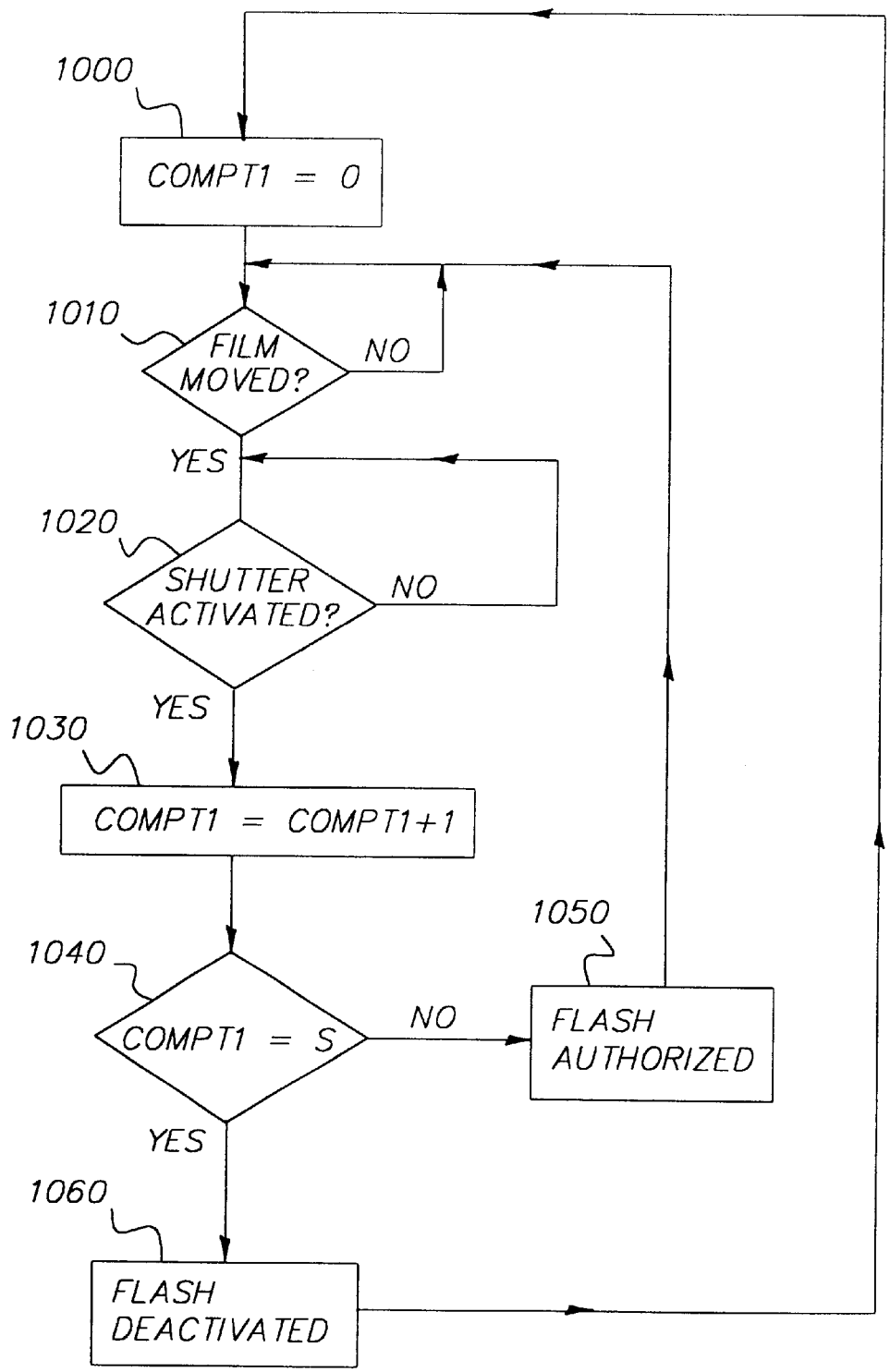
FIG. 3 is a flowchart of a first functioning embodiment of the apparatus according to the invention.

Now referring to FIG. 3, a first functioning embodiment of the camera according to the invention can be seen. The process to prevent unauthorized reuse of the one-time use camera comprises the steps of emitting a first signal when the film is moved in the camera and a second signal when the shutter release is activated. Then the value of the first counter 41 is varied whenever both these signals are emitted successively. It is provided that a program, for example the internal program of the flash control circuit, detects the emission of these signals, manages the value of the first counter 41 and deactivates the flash function if necessary. The first counter, referenced COMPT1, is initialized to zero at step 1000. Then at step 1010 a check is made that the film is moved by recording the emission of a pulse by the sensor 420 when a film perforation passes. If the film is moved, at step 1020 a check is made that the shutter release is activated, otherwise step 1010 is restarted, that is a check is made again that the film is moved. If the shutter release is activated, at step 1030 the first counter COMPT1 is incremented, otherwise step 1020 is restarted, that is a check is made again that the shutter release is activated. When the shutter release is activated, it can be seen at step 1040 whether the first counter COMPT1 is equal to the limit value S, for example 24. If this is the case, the flash circuit is deactivated at step 1060, otherwise the flash is authorized (step 1050) and step 1010 is restarted, that is a check is made again that the film is moved.

Figure 4:
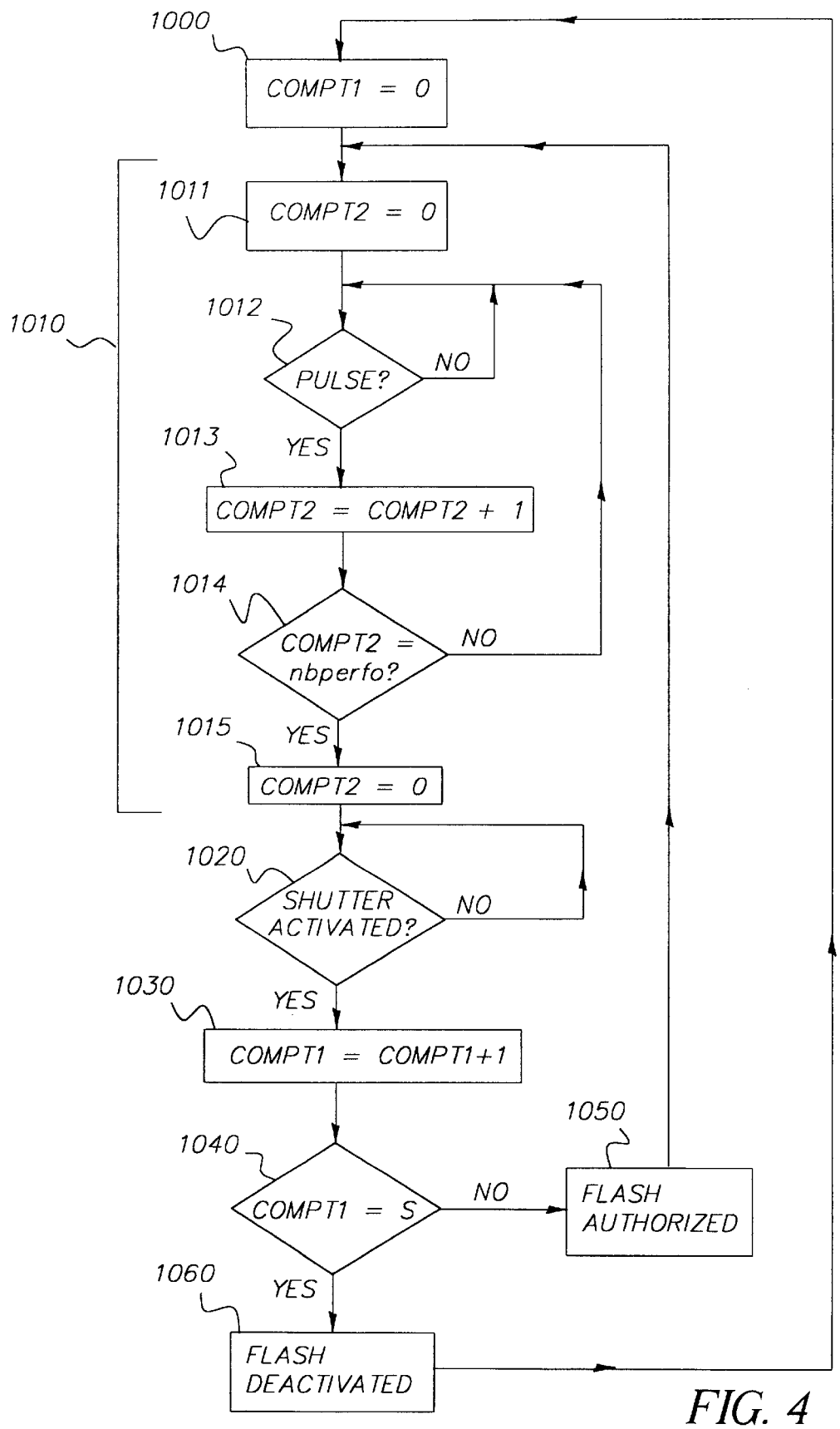
FIG. 4 is a flowchart of a preferred functioning embodiment of the apparatus according to the invention.

According to a second preferred functioning embodiment of the camera, in addition a check is made that the film is moved by the length corresponding approximately to one film shot area. The functioning method is identical to that described at FIG. 3 and the way in which the film movement is detected is specified at FIG. 4. For this purpose the camera comprises in addition the second counter COMPT2 which counts the number of pulses generated by the sensor 420 when a film perforation passes. The second counter COMPT2 is initialized to zero at step 1011. A check is made whether a pulse is generated at step 1012. If a pulse is detected, the second counter COMPT2 is incremented at step 1013, otherwise step 1012 is restarted, that is a check is made again whether a pulse is generated. When a pulse is detected, at step 1014 a check is made if the second counter COMPT2 equals the number of perforations, nb perfo, of the film corresponding to a film shot area. If this is the case it is considered that the film has been moved, the second counter COMPT2 is reset to zero at step 1015 and a check is made whether the shutter release is activated at step 1020. Otherwise it is considered that the film has not moved and step 1012 is restarted, that is a check is made again whether a pulse is detected.

In this way, an unauthorized person would find it difficult to reload the camera according to the invention, and no mechanical part of the camera is destroyed.

The invention has been described in detail with particular reference to certain preferred embodiments thereof, but it will be understood that variations and modifications can be effected within the spirit and scope of the invention.

What is claimed is:

1. A one-time use camera including a film, the camera comprising a shutter release and a device adapted to deactivate a camera function in order to prevent unauthorized reuse of the camera, the deactivating device comprising:

a first counter having a value which changes when it is detected that the film is moved inside the camera and that the shutter release is activated; and a detector adapted to detect the film movement;

wherein the camera function is deactivated when the first counter reaches a limit value S.

2. The camera of claim 1, wherein the detector is adapted to detect that the film is moved by a length corresponding approximately to one film shot area.

3. The camera of claim 1, wherein the detector comprises a sensor adapted to generate a pulse when a film perforation passes thereby, the camera comprising a second counter that counts the number of pulses generated.

4. The camera of claim 3, wherein the detector comprises a source of infrared radiation associated with an infrared sensor.

5. The camera of claim 4, wherein the film movement is detected when the second counter counts a number of pulses equal to the number of film perforations corresponding to one film shot area.

6. The camera of claim 1, wherein the camera function deactivated when the first counter reaches the limit value S is a flash function.

7. A process for preventing unauthorized reuse of a one-time use camera including a film, the camera comprising a shutter release and a device adapted to deactivate a camera function in order to prevent unauthorized reuse of the camera, the process comprising:

a) emitting a first signal when the film is moved in the camera;
  b) emitting a second signal when the shutter release is activated,
  c) varying a value of a first counter when the first and second signals emitted in steps a) and b) are emitted successively; and
  d) deactivating a camera function when the first counter reaches a limit value S.

8. The process of claim 7, wherein the first signal is emitted when the film is moved by a length corresponding approximately to one film shot area.

9. The process of claim 7, wherein a sensor generates a pulse when a film perforation passes, and wherein a second counter counts the number of pulses generated by the sensor so that the first signal is emitted when the number of pulses equal to the number of film perforations corresponding to one film shot area is counted.

10. The process of claim 7, wherein the flash is deactivated when the first counter reaches a limit value S.

* * * * *